US011778299B2

United States Patent
Druker et al.

(10) Patent No.: US 11,778,299 B2
(45) Date of Patent: Oct. 3, 2023

(54) INTEGRATED MOBILE DEVICE ENCLOSURES

(71) Applicant: GoPro, Inc., San Mateo, CA (US)

(72) Inventors: Joshua Todd Druker, Redwood City, CA (US); Jonathan Leland Thorn, San Leandro, CA (US)

(73) Assignee: GoPro, Inc., San Mateo, CA (US)

(*) Notice: Subject to any disclaimer, the term of this patent is extended or adjusted under 35 U.S.C. 154(b) by 32 days.

(21) Appl. No.: 17/214,407

(22) Filed: Mar. 26, 2021

(65) Prior Publication Data

US 2021/0306534 A1    Sep. 30, 2021

Related U.S. Application Data

(60) Provisional application No. 63/002,799, filed on Mar. 31, 2020.

(51) Int. Cl.
| | |
|---|---|
| *H04N 23/57* | (2023.01) |
| *H04M 1/02* | (2006.01) |
| *G03B 30/00* | (2021.01) |
| *H04R 3/00* | (2006.01) |
| *H04R 5/04* | (2006.01) |
| *G03B 31/00* | (2021.01) |
| *H04N 23/51* | (2023.01) |
| *H04N 23/55* | (2023.01) |
| *H04M 1/72409* | (2021.01) |

(52) U.S. Cl.
CPC .............. *H04N 23/57* (2023.01); *G03B 30/00* (2021.01); *G03B 31/00* (2013.01); *H04M 1/0264* (2013.01); *H04M 1/724092* (2022.02); *H04N 23/51* (2023.01); *H04N 23/55* (2023.01); *H04R 3/005* (2013.01); *H04R 5/04* (2013.01)

(58) Field of Classification Search
CPC .................................................... H04N 5/2257
USPC ........................................................... 348/374
See application file for complete search history.

(56) References Cited

U.S. PATENT DOCUMENTS

2018/0213903 A1*    8/2018    Tu ..................... H04B 1/3888

OTHER PUBLICATIONS

Ron Amadeo, "Red quits the smartphone business after a single, terrible phone", Ars Technica, https://arstechnica.com/gadgets/2019/10/red-quits-the-smartphone-business-after-a-single-terrible-phone/, printed Mar. 31, 2021, 6 pages.

\* cited by examiner

*Primary Examiner* — Joel W Fosselman
(74) *Attorney, Agent, or Firm* — Young Basile Hanlon & MacFarlane, P.C.

(57) ABSTRACT

An integrated mobile device enclosure which encloses a mobile device includes features configured to enhance the capturing and/or processing of content at the mobile device. An integrated mobile device enclosure may include a body configured to enclose at least a portion of a mobile device, one or more microphones configured to capture sound external to the mobile device, and one or more lights configured to support a camera of the mobile device. The one or more microphones and the one or more lights are used with a software application running on the mobile device for content capture and/or processing. The software application in at least some cases may selectively enable or disable ones of the microphones and/or lights based on environmental information measured within a location of the mobile device.

20 Claims, 9 Drawing Sheets

INTEGRATED MOBILE DEVICE ENCLOSURES

CROSS REFERENCE TO RELATED APPLICATION(S)

This application claims priority to and the benefit of U.S. Provisional Application Patent Ser. No. 63/002,799, filed Mar. 31, 2020, the entire disclosure of which is hereby incorporated by reference.

TECHNICAL FIELD

This disclosure relates to mobile device enclosures, and more specifically, to integrated mobile device enclosures, such as mobile device enclosures into which secondary devices such as microphones, lights, or the like may be integrated.

BACKGROUND

Mobile device enclosures, such as phone or tablet cases, are commonly used as a protective material layer surrounding some or all of a mobile device. In one example, a mobile device enclosure may include a rear surface which covers an entire rear surface of a mobile device except portions including an image sensor, a front lip which surrounds a perimeter of a front surface of the mobile device, and sides which cover the four sides of the mobile device except portions including microphones. Conventional mobile device enclosures are often limited to protecting the mobile device from damage and thus do not introduce additional features or functionality to or enhance the features or functionality of the mobile device.

SUMMARY

Disclosed herein are embodiments of integrated mobile device enclosures and techniques which may be performed using integrated mobile device enclosures.

In one embodiment, an integrated mobile device enclosure according to this disclosure comprises a body, one or more microphones, a lighting array, an integrated circuit, and a device mount. The body is configured to enclose at least a portion of a mobile device and includes at least an exterior surface and an interior surface in which the exterior surface includes an opening for a rear-facing camera of the mobile device and a lip of the interior surface encloses at least a portion of a front surface of the mobile device when the mobile device is enclosed by the body. The one or more microphones are disposed within one or more first portions of the body and are configured to capture sound external to the mobile device. The lighting array is disposed within a second portion of the body proximate to the opening of the exterior surface and includes one or more lights configured to support the rear-facing camera of the mobile device. The integrated circuit is disposed within a third portion of the body and configures the one or more microphones and the one or more lights for use with a software application running on the mobile device. The device mount is disposed within a fourth portion of the body and includes two finger members movable relative to the body between an extended state and a collapsed state, in which the two finger members extend outward from the body for receipt by a support mount of an external support in the extended state and the two finger members are collapsed toward the body in the collapsed state.

In another embodiment, an integrated mobile device enclosure according to this disclosure comprises a body, one or more microphones, a lighting array, and an integrated circuit. The body is configured to enclose at least a portion of a mobile device. The one or more microphones are disposed within one or more first portions of the body and configured to capture sound external to the mobile device. The lighting array is disposed within a second portion of the body and includes one or more lights configured to support a camera of the mobile device. The integrated circuit is disposed within a third portion of the body, in which the integrated circuit configures the one or more microphones and the one or more lights for use with a software application running on the mobile device.

In yet another embodiment, an integrated mobile device enclosure according to this disclosure comprises a body, one or more microphones, and one or more lights. The body is configured to enclose at least a portion of a mobile device. The one or more microphones are removably coupled to the body and configured for use with a software application running on the mobile device. The one or more lights are removably coupled to the body and configured for use with the software application.

These and other aspects of this disclosure are disclosed in the following detailed description, the appended claims, and the accompanying figures.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Integrated mobile device enclosures can be used with mobile devices to provide additional features or functionality to a mobile device. Expanded functionality can be achieved using secondary devices integrated within a mobile device enclosure, for example, lighting devices and/or microphone devices built into the integrated mobile device enclosure for interfacing with a mobile device enclosed by the integrated mobile device enclosure. Communication between the various secondary devices integrated within the integrated mobile device enclosure and the mobile device can be achieved through mated input/output (I/O) interfaces, as described below.

The additional features or functionality provided to the mobile device by the integrated mobile device enclosure may enhance content capture abilities of the mobile device (e.g., for capturing image, video, audio, or a combination thereof). The quality of content captured using an integrated mobile device enclosure as disclosed herein may be improved as compared to the quality of content which could be captured using the mobile device but without the integrated mobile device enclosure. For example, a content creator using an integrated mobile device enclosure as disclosed herein may use improved lighting, directional microphones, or other aspects of the integrated mobile device enclosure to capture high quality content.

Figure 1A:
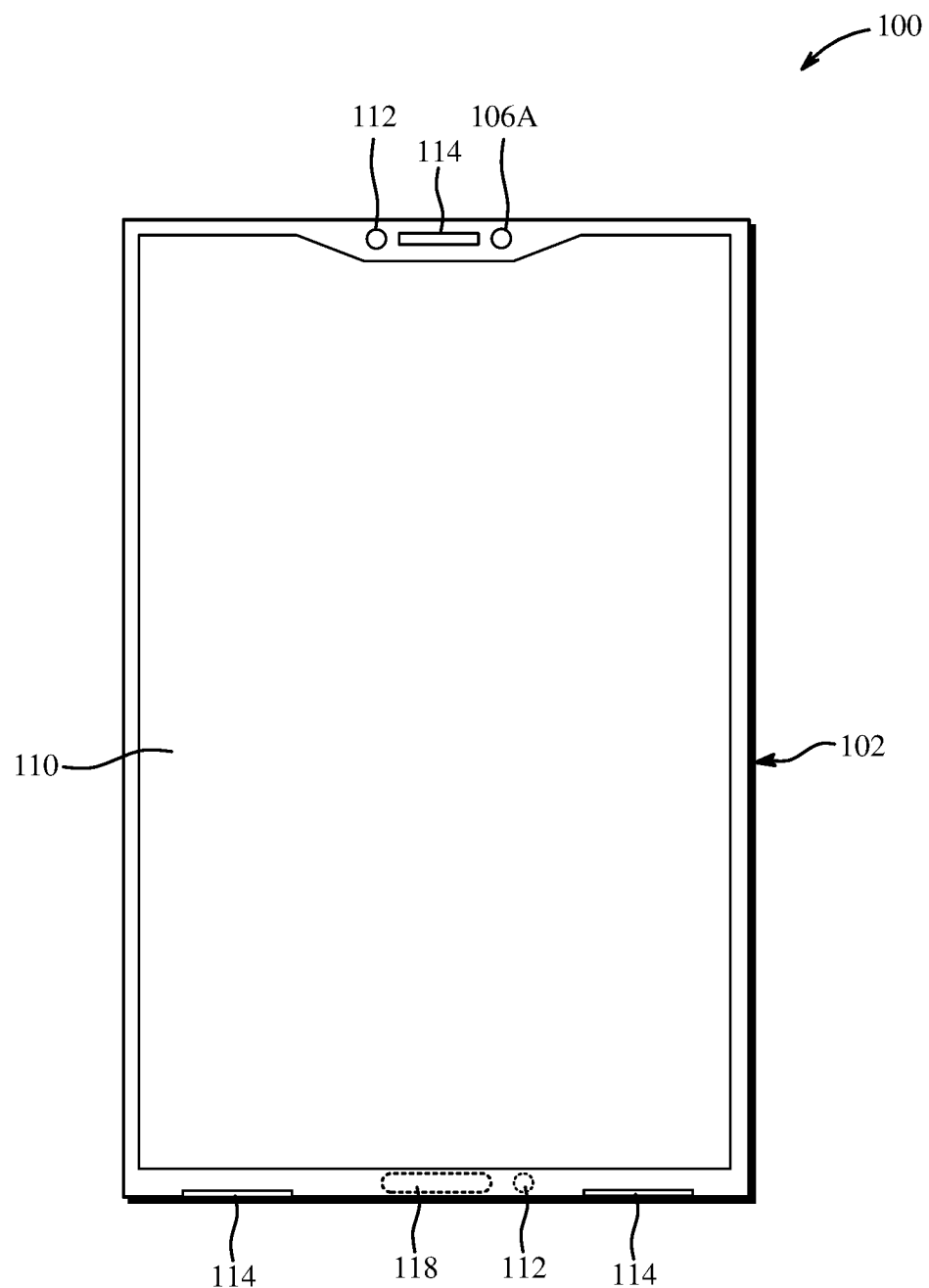
FIGS. 1A-B are illustrations of an example of a mobile device.
Figure 1B:
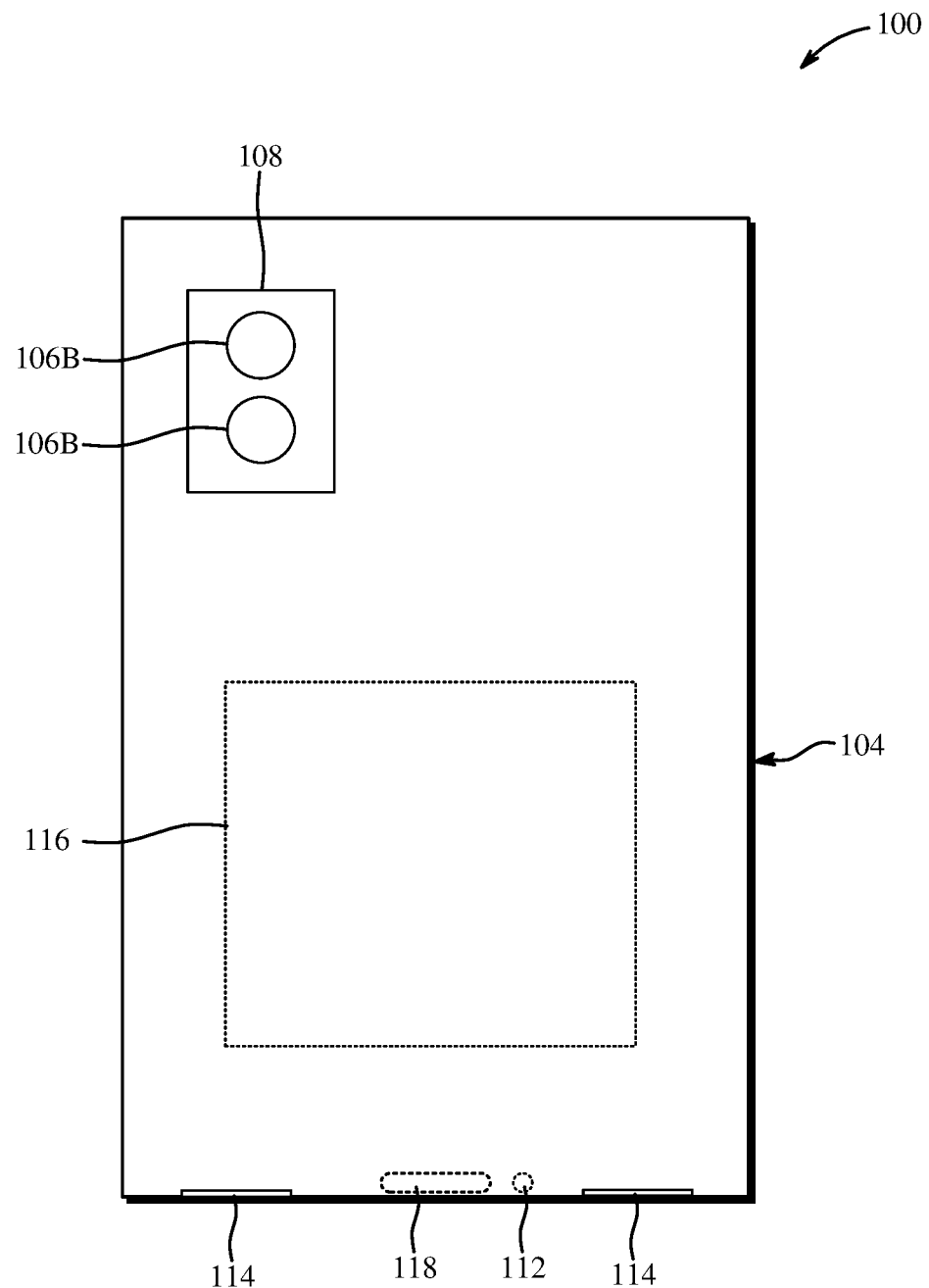

FIGS. 1A-B are illustrations of an example of a mobile device 100. As shown, the mobile device is a smart phone. However, other examples of a mobile device which may be used with the embodiments of this disclosure include, but are not limited to, a tablet, an image capture device, a cell phone other than a smart phone, a notebook computer, a wearable device, or the like. FIG. 1A shows an illustration of a front surface 102 of the mobile device 100. FIG. 1B shows an illustration of a rear surface 104 of the mobile device 100.

The mobile device 100 includes components for capturing images, video, and/or audio. For example, the mobile device 100 includes a front-facing camera 106A and a rear-facing camera assembly 108 including rear-facing cameras 106B. Sensors of one or both of the front-facing camera 106 or the rear-facing camera 108 may be configured to capture images and/or video, which may be displayed on a display 110 of the mobile device 100. In another example, the mobile device 100 includes microphones 112 positioned around the mobile device 100. The microphones 112 may be configured to capture audio, which may later be output using one or more speakers 114 of the mobile device 100.

In some embodiments, the mobile device 100 may include one front-facing camera 106A, one rear-facing camera 106B, and one microphone 112. In some embodiments, the mobile device 100 may include one front-facing camera 106A, one-rear facing camera 106B, and multiple microphones 112. In some embodiments, the mobile device 100 may include one front-facing camera 106A, multiple rear-facing cameras 106B, and one microphone 112. In some embodiments, the mobile device 100 may include one front-facing camera 106A, one rear-facing camera 106B, and multiple microphones 112. In some embodiments, the mobile device 100 may include multiple front-facing cameras 106A, multiple rear-facing cameras 106B, and/or multiple microphones 112.

The mobile device 100 includes a power source 116, such as a battery, enclosed between the front surface 102 and the rear surface 104. The mobile device 100 includes an I/O port 118 for receiving a connector. For example, the connector may be an I/O port of an integrated mobile device enclosure which encloses the mobile device 100. In another example, the connector may be a charging cable used to charge the power source 116 (e.g., a USB type connector such as USB-C, Lightning, or other connection types). In yet another example, the connector may be a multimedia connector (e.g., HDMI) used to input a media signal to the mobile device 100 or to output a media signal from the mobile device 100. Although a single I/O port 118 is shown, in some embodiments, the mobile device 100 may include multiple I/O ports.

Figure 2A:
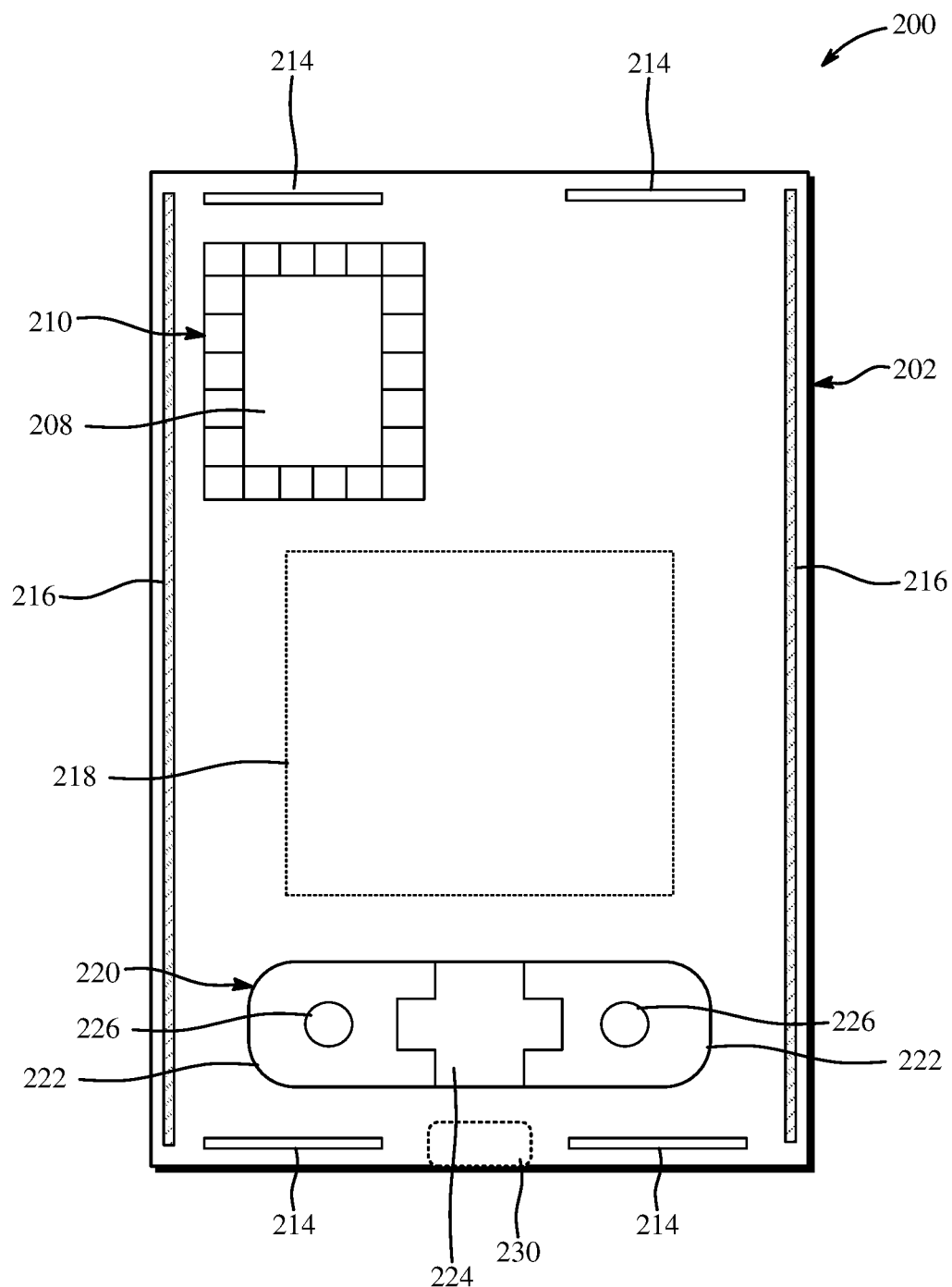
FIGS. 2A-B are illustrations of an example of an integrated mobile device enclosure.
Figure 2B:
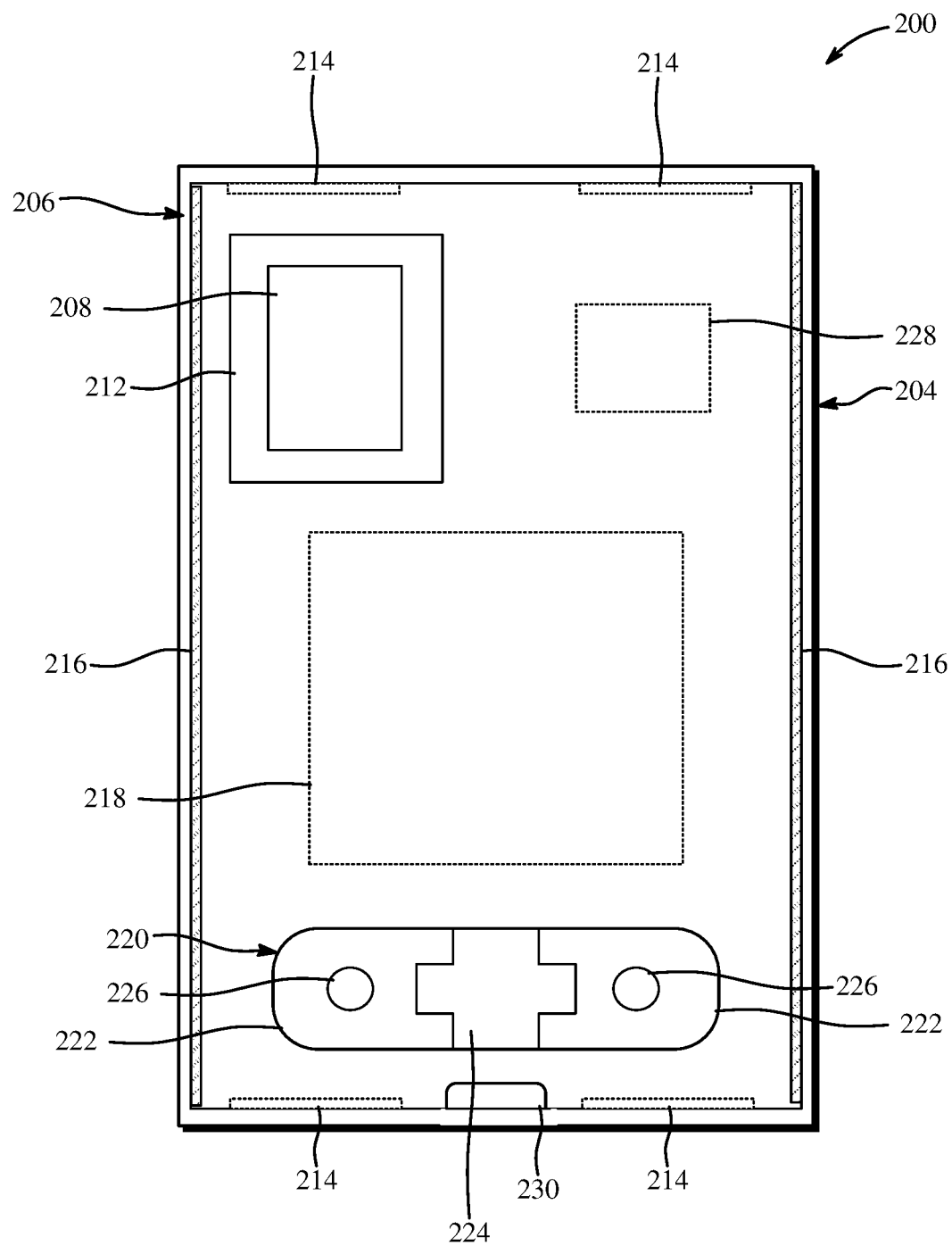

FIGS. 2A-B are illustrations of an example of an integrated mobile device enclosure 200 for a mobile device, which may, for example, be the mobile device 100 shown in FIGS. 1A-B. FIG. 2A shows an illustration of an exterior surface 202 of the integrated mobile device enclosure 200, which exterior surface 202 opposes the mobile device. FIG. 2B shows an illustration of an interior surface 204 of the integrated mobile device enclosure 200, which interior surface 204 abuts the mobile device.

The integrated mobile device enclosure 200 is an enclosure, such as a case, which secures (e.g., surrounds, covers, encases, or confines) all or a portion of the mobile device. The integrated mobile device enclosure 200 may be shaped to releasably secure the mobile device. For example, where the mobile device is a smart phone, the smart phone may be press fit or otherwise secured within a cavity formed by side walls of the integrated mobile device enclosure 200. A body of the integrated mobile device enclosure 200 may be generally formed of pliable or substantially pliable materials such as rubber, leather, vinyl, neoprene, etc. The integrated mobile device enclosure 200 may be configured for use in various environments. For example, the integrated mobile device enclosure 200 may be waterproof and/or include waterproofing features that protect the mobile device from water.

The degree to or amount by which the integrated mobile device enclosure 200 encloses the mobile device is defined by the particular embodiment of the integrated mobile device enclosure 200. For example, in some embodiments, the exterior surface 202 may enclose an entire rear surface of the mobile device (e.g., the rear surface 104 shown in FIG. 1B) except portions including some or all of a camera assembly (e.g., the camera assembly 108 shown in FIG. 1B) on the rear surface of the mobile device, and the interior surface 204 may include a lip 206 which encloses a perimeter of a front surface of the mobile device (e.g., the front surface 102 shown in FIG. 1A). In another example, the other embodiments, the exterior surface 202 may enclose the entire rear surface of the mobile device except portions including a camera (e.g., one or more of the rear cameras 106B shown in FIG. 1B) and the interior surface 204 may enclose the entire front surface of the mobile device except portions including a camera (e.g., the camera 106 shown in FIG. 1A) and/or a display (e.g., the display 110 shown in FIG. 1A). Other embodiments of the integrated mobile device enclosure 200 corresponding to different structures for enclosing the mobile device are possible.

As shown, the integrated mobile device enclosure 200 is comprised of a single body piece including the exterior surface 202 and the interior surface 204. For example, the single body piece receives the mobile device, such as through an opening which may or may not be selectively extended to insert and remove the mobile device. In some embodiments, however, the integrated mobile device enclosure 200 may be comprised of a front surface piece including the exterior surface 202 and a rear surface piece including the interior surface 204. For example, the front surface piece and the rear surface piece may be removably coupled to one another, such as to enable insertion and removal of the mobile device, using one or more types of coupling mechanisms at one or more locations around the front surface piece and/or the rear surface piece.

The exterior surface 202 defines an opening 208 suitable to allow a lens of a rear camera or lenses or rear cameras (e.g., one or both of the cameras 106B) of the mobile device to capture light through the integrated mobile device enclosure 200. The integrated mobile device enclosure 200 includes a lighting array 210 situated nearby to the opening 208. The lighting array 210 includes one or more lights which may be controlled in connection with the operation of the rear camera or rear cameras of the mobile device. Namely, the one or more lights of the lighting array 210 may be configured to introduce enhanced lighting support for the rear camera or rear cameras when same is or are engaged in an image or video capture operation. A covering 212 protects components of the lighting array 210 from contact by the mobile device, when enclosed within the integrated mobile device enclosure 200. In some embodiments, the covering 212 may be omitted.

The shape and size of the opening 208 may be based on the design of the rear-facing camera assembly of the mobile device. The arrangement of the lighting array 210 may be based on the shape and size of the opening 202. As shown, the opening 208 is rectangular in shape and sized to suitably allow the entire lens of the two rear cameras 106B of the mobile device to capture light through the integrated mobile device enclosure 200. The lighting array 210 is thus shown in one embodiment as an arrangement surrounding the rectangular-shaped opening 208. In particular, in the embodiment shown, the lighting array 210 includes twenty two lights (e.g., LED or other light types) arranged in a rectangle abutting the opening 208. However, arrangements of the lighting array 210 other than as shown may be used.

In some embodiments where the opening 208 is rectangular in shape, the lighting array 210 may include more or fewer than twenty two lights. In some embodiments, the opening 208 may be square in shape. For example, the opening 208 may be structured to suitably allow a lens of a single rear camera 106B to capture light through the integrated mobile device enclosure 200. In some such embodiments, the lighting array 210 may include twelve lights, such as where each side of the lighting array 210 surrounds the opening 208 with four lights. In some such embodiments, the lighting array 210 may include nine lights, such as where each side of the lighting array 210 surrounds the opening 208 with three lights. In some embodiments, the opening 208 may be of a shape other than a square or other rectangle (e.g., because the lens of the camera of the mobile device is generally non-rectangular). In some such embodiments, the lighting array 210 may include a number of lights arranged in a non-square shape abutting the opening 208. In some embodiments, the lighting array 210 may include a single light which is shaped to surround some or all of the opening 208. Other arrangements of the lights included within the lighting array 210 are possible.

In some embodiments, the lighting array 210 may not be abutting the opening 208. In some such embodiments, the lighting array 210 may still be located proximate to the opening 208 and/or have a shape similar to the shape of the opening 208. In other such embodiments, the lighting array 210 may not be located proximate to the opening 208 and/or may not have a shape similar to the shape of the opening 208. For example, the lighting array 210 may include a single row or column of lights located above, below, or to one side of the opening 208. In another example, the lighting array 210 may include multiple rows and/or columns of lights located above, below, and/or to one or more sides of the opening 208, which multiple rows and/or columns may or may not intersect. Other arrangements of the locations of the lights included within the lighting array 210 relative to the opening 208 are possible.

In some embodiments, where the mobile device has multiple rear-facing camera assemblies, the integrated mobile device enclosure 200 may include multiple openings. In some such embodiments, a single lighting array 210 may be used with each of the multiple openings, such as to support and enhance images and video captured using each of the rear-facing camera assemblies of the mobile device. In other such embodiments, the integrated mobile device enclosure 200 may include multiple lighting arrays. For example, each of the multiple lighting arrays may abut a different opening.

The lighting array 210 is disposed within a portion of the integrated mobile device enclosure 200. In that the lighting array 210 is intended to support a camera of the mobile device enclosed by the integrated mobile device enclosure 200, variations of the integrated mobile device enclosure 200 may be provided to accommodate different mobile device types, such as mobile device types in which the respective cameras are at different locations along rear surfaces of the respective mobile devices. As such, although the lighting array 210 as shown is disposed within a particular portion of the integrated mobile device enclosure 200, in some embodiments, the lighting array 210 may instead be disposed within a different portion of the integrated mobile device enclosure 200. Other arrangements of the location of the lighting array 210 are possible.

In some embodiments, the lighting array 210 or another lighting array may be located proximate to a front-facing camera assembly of the mobile device. For example, a lighting array may be disposed within or proximate to a portion of the lip 206 which depends further along a front surface of the mobile device in order to provide a lighting array for additional lighting support to a front-facing camera of the mobile device (e.g., the front-facing camera 106A shown in FIG. 1A). In some such embodiments, where the mobile device includes multiple front-facing cameras, the integrated mobile device enclosure 200 may include multiple additional lighting arrays disposed within or proximate to the lip 206.

The integrated mobile device enclosure 200 includes one or more microphones 214 which may be configured or otherwise used for capturing audio, such as with or without a corresponding image or video capture from a camera of the mobile device enclosed within the integrated mobile device enclosure 200. The microphones 214 can be multi-directional, can have a variety of sensitivity thresholds, and/or can work together with microphones of the mobile device to provide a complex audio capture capability. The microphones 214 may thus be used in addition to or in place of one or more built-in microphones of the mobile device, such as to capture one or more audio signals. For example, the audio signals captured using the microphones 214 may be used to enhance an audio signal captured using the built-in microphone of the mobile device. In another example, the audio signals captured using the microphones 214 may be used as the main audio signal captured, such as where the built-in microphone of the mobile device is selectively disabled for use in audio capture. In some embodiments, the microphones 214 may be stereo microphones configured to capture sound in stereo channels. In some embodiments, the microphones 214 may be directional microphones configured to capture sound in one or more directions relative to the integrated mobile device enclosure 200.

The microphones 214 may be arranged about the integrated mobile device enclosure 200 to prevent overlap of the microphones 214 with built-in microphones of the mobile device. Although the microphones 214 as shown are arranged near top and bottom boundaries of the integrated mobile device enclosure 200, other arrangements of the microphones 214 are possible. In some embodiments, the microphones 214 be arranged on the left and right sides of the integrated mobile device enclosure 200. In some embodiments, the microphones 214 be arranged on one of the top, bottom, left, or right sides of the integrated mobile device enclosure 200. In some embodiments, the microphones 214 be arranged on more than one of the top, bottom, left, or right sides of the integrated mobile device enclosure 200. In some embodiments, the microphones 214 may be located only on the interior surface 204. In some embodiments, the microphones 214 may be located only on the exterior surface 202. In some embodiments, the microphones 214 may be located on both the exterior surface 202 and the interior surface 204. Other arrangements of the microphones 214 are possible.

The integrated mobile device enclosure 200 includes one or more openings 216 for enhancing audio capture using the microphones 214 and/or using built-in microphones of the mobile device. In some embodiments, the openings 216 may be completely open. In some embodiments, the openings 216 may be partially open, for example, where the openings 216 are partially covered using a thin material through which audio signals can pass. In some embodiments, the openings 216 may be omitted.

The integrated mobile device enclosure 200 includes a supplemental power source 218. The supplemental power source 218 may be a battery which is compatible with the mobile device enclosed within the integrated mobile device enclosure, such as to supply power to the mobile device in addition to or instead of power which may be supplied by a power source built into the mobile device (e.g., the power source 116 shown in FIG. 1B). For example, the supplemental power source 218 may be a battery. In some embodiments, the supplemental power source 218 may be configured to deliver power to components of the integrated mobile device enclosure 200, such as instead of or in addition to components of the mobile device. For example, the supplemental power source 218 may be configured to deliver power to one of more of the microphones 214 and/or to one or more lights of the lighting array 210. In some embodiments, the integrated mobile device enclosure 200 may omit the supplemental power source 218. For example, omitting the supplemental power source 218 may enable the integrated mobile device enclosure 200 to have a smaller form factor. In some such embodiments, the components of the integrated mobile device enclosure 200 may derive power from the power source built into the mobile device. In other such embodiments, the components of the integrated mobile device enclosure 200 may derive power from an external power source which may be connected to the mobile device and/or to the integrated mobile device enclosure 200.

The supplemental power source 218 is disposed within a portion of the integrated mobile device enclosure 200. As shown, the supplemental power source 218 is disposed within a generally central portion of the interior surface 204. However, arrangements of the supplemental power source 218 other than as shown may be used. In some embodiments, the supplemental power source 218 may be disposed within a generally upper portion of the interior surface 204. In some embodiments, the supplemental power source 218 may be disposed within a generally lower portion of the interior surface 204. In some embodiments, the supplemental power source 218 may be disposed on a portion of the exterior surface 202.

A device mount 220 is disposed within a portion of the integrated mobile device enclosure 200. The device mount 220 includes two finger members 222 movable relative to the exterior surface 202 between an extended state and a collapsed state. The device mount 220 further includes a central member 224 in between the two finger members 222 and which couples the device mount 220 to the integrated mobile device enclosure 200. The finger members 222 include openings 226 configured for receipt by a support mount of an external support (e.g., a beam, a stand, a connector, or another device configured to mount the device mount 220). The finger members 222 may rotate substantially 90 degrees between the extended state and the collapsed state and/or in opposite directions from each other. The finger members 222 may rotate independent of each other, for example, such that one of the finger members 222 may be in the extended position, while the other of the finger members 222 may simultaneously be in the collapsed position. In some embodiments, the exterior surface 202 may include an aperture that permits the finger members 222 to be moved (e.g., rotated) between the extended state and the collapsed state.

The device mount 220 is reconfigurable (e.g., is collapsible, movable, or foldable) between the extended state and the collapsed state. In the extended state, the device mount 220 is arranged for being coupled to the support mount. In particular, in the extended state, the device mount 220 extends away from the exterior surface 202 for receipt by the support mount. In the collapsed state, the device mount 220 is collapsed toward and is oriented substantially within or otherwise along the exterior surface 202. The integrated mobile device enclosure 200 is more compact in the collapsed state than in the extended state. In the collapsed state, the device mount may be configured to not be receivable (e.g., not be fully receivable) by the support mount of the external support for retention thereto.

In the example shown, the integrated mobile device enclosure 200 includes a single device mount 220 located on a lower portion of the integrated mobile device enclosure 200. However, arrangements of the device mount 220 other than as shown may be used. In some embodiments, the device mount 220 may be located on a middle portion of the integrated mobile device enclosure 200. In some embodiments, the device mount 220 may be located on an upper portion of the integrated mobile device enclosure 200. In some embodiments, the device mount 220 may be located other than on the exterior surface 202 of the integrated mobile device enclosure 200. For example, the device mount 220 may be located on a side of the integrated mobile device enclosure 200. In some embodiments, the integrated mobile device enclosure 200 may include multiple device mounts, which may have the same form or different forms. For example, each of the multiple device mounts may be configured for different mounting orientations and/or mounting styles, such as which may be adapted for the same or different external supports. In another example, each of the multiple device mounts may be of different sizes and be configured for targeted mounting on different sized device mounts. In some embodiments, the integrated mobile device enclosure 200 may omit the device mount 220.

The integrated mobile device enclosure 200 includes an integrated circuit 228 which delivers functionality of the integrated mobile device enclosure 200. For example, the integrated circuit 228 may store or otherwise include instructions for enabling or otherwise configuring an interface between components of the integrated mobile device enclosure 200 (e.g., the lighting array 210, the microphones 214, the supplemental power source 218, and/or other components thereof) and components of the mobile device. In another example, the integrated circuit 228 may store or otherwise include instructions for or usable by a software application used for enhanced content capture and/or processing, such as which may be configured to interface with components of the mobile device. In yet another example, the instructions stored or otherwise included in the integrated circuit 228 may be or include instructions for both enabling or otherwise configuring an interface between components of the integrated mobile device enclosure 200 and components of the mobile device and for or usable by the software application for enhanced content capture and/or processing. The integrated circuit 228 may, for example, be a field programmable gate array (e.g., FPGA), a programmable logic device (PLD), a reconfigurable computer fabric (RCF), a system on a chip (SoC), an application specific integrated circuit (ASIC), and/or another type of integrated circuit. In some embodiments, the integrated circuit 228 may be omitted.

Driver software, such as which may be installed on or otherwise available from the integrated circuit 228, for the components of the integrated mobile device enclosure 200 compatible with the operating system of the mobile device may enable the components of the integrated mobile device enclosure 200 to directly communicate using and otherwise be used with native or other software applications installed on the mobile device. Alternatively, a software application available for download may be installed on the mobile device to cause the components of the mobile device to establish communications with and otherwise use the components of the integrated mobile device enclosure 200. For example, the software application, when run on a mobile device enclosed within the integrated mobile device enclosure 200, may configure the components of the integrated mobile device enclosure 200 for use with components of the mobile device. The software application may, for example, be or include the software application described above for enhanced content capture and/or processing. Further examples of a software application which may be used for enhanced content capture and/or processing are described below with respect to FIGS. 5-7.

The expanded functionality provided by the integrated mobile device enclosure 200 to the mobile device enclosed within the integrated mobile device enclosure 200, such as for enhanced image, video, and/or audio content capture and/or processing, may be made available in one or more ways. As shown, the integrated mobile device enclosure 200 includes an I/O port 230 designed to interface with an I/O port of the mobile device. For example, the I/O port 230, when received within the I/O port of the mobile device, may enable communication between components of the integrated mobile device enclosure 200 (e.g., the lighting array 210, the microphones 214, the supplemental power source 218, the integrated circuit 228, and/or other components thereof) and components of the mobile device. In some embodiments, the I/O port 230 may be omitted. In some such embodiments, the integrated mobile device enclosure 200 may include a wireless network interface for establishing wireless communication with the mobile device, for example, using Bluetooth®, Wi-Fi, Zigbee, Z-Wave, NFC, or another protocol or a combination of protocols.

In some embodiments, the I/O port 230 may be used to facilitate power communications between the mobile device and the integrated mobile device enclosure 200. For example, a power source of the mobile device can be used to supply power to the integrated mobile device enclosure 200 through the I/O port 230, when connected to an I/O port of the mobile device. In some such embodiments, the power communicated through the I/O port 230 may be used to charge the supplemental power source 218. In other such embodiments, the supplemental power source 218 may be omitted.

In some embodiments, some or all components of the integrated mobile device enclosure 200 may be removably coupled to the integrated mobile device enclosure 200. For example, the lighting array 210, the microphones 214, the supplemental power source 218, and/or the device mount 220 may be operatively removable from the integrated mobile device enclosure 200. In some embodiments, certain components of the integrated mobile device enclosure 200 may be removably coupled to the integrated mobile device enclosure 200 while other components are permanently coupled to the integrated mobile device enclosure 200.

For example, the lighting array 210 may be removably coupled to the integrated mobile device enclosure 200 while the microphones 214, the supplemental power source 218, and the device mount 220 may be permanently coupled to the integrated mobile device enclosure 200. In another example, the microphones 214 may be removably coupled to the integrated mobile device enclosure 200 while the lighting array 210, the supplemental power source 218, and the device mount 220 may be permanently coupled to the integrated mobile device enclosure 200. In another example, the supplemental power source 218 may be removably coupled to the integrated mobile device enclosure 200 while the lighting array 210, the microphones 214, and the device mount 220 may be permanently coupled to the integrated mobile device enclosure 200. In another example, the device mount 220 may be removably coupled to the integrated mobile device enclosure 200 while the lighting array 210, the microphones 214, and the supplemental power source 218 may be permanently coupled to the integrated mobile device enclosure 200.

In another example, the lighting array 210 and the microphones 214 may be removably coupled to the integrated mobile device enclosure 200 while the supplemental power source 218 and the device mount 220 may be permanently coupled to the integrated mobile device enclosure 200. In another example, the lighting array 210 and the supplemental power source 218 may be removably coupled to the integrated mobile device enclosure 200 while the microphones 214 and the device mount 220 may be permanently coupled to the integrated mobile device enclosure 200. In another example, the lighting array 210 and the device mount 220 may be removably coupled to the integrated mobile device enclosure 200 while the microphones 214 and the supplemental power source 218 may be permanently coupled to the integrated mobile device enclosure 200. In another example, the lighting array 210 and the device mount 220 may be removably coupled to the integrated mobile device enclosure 200 while the microphones 214 and the supplemental power source 218 may be permanently coupled to the integrated mobile device enclosure 200. Other examples are also possible.

In some embodiments, removably coupled components of the integrated mobile device enclosure 200 may be modular such that a user of the integrated mobile device enclosure 200 can replace such removable components with new components to, for example, change aesthetic and/or functionality aspects of the integrated mobile device enclosure 200. For example, a user of the integrated mobile device enclosure 200 may replace a first lighting array having nine lights with a second lighting array having twelve lights, such as for additional lighting support for content capture. In another example, a user of the integrated mobile device enclosure 200 may replace a first device mount configured with movable finger members with a second device mount configured with a different mounting mechanism, such as a mechanism which uses a threaded coupling element, a snap fit engagement element, or another element. Accordingly, in some embodiments, certain of the functionality of the integrated mobile device enclosure 200, implemented by components thereof, may change based on the replacement of components.

In some embodiments, the integrated mobile device enclosure 200 may include components other than those as shown. In some such embodiments, the integrated mobile device enclosure 200 may include a display. For example, the display may output a preview of content being captured and/or processed using the enhanced functionality provided by the integrated mobile device enclosure 200. In another example, the display may output information associated with a software application for enhanced content capture and/or processing. In yet another example, the display may output a combination of the content preview, the software application information, and/or further aspects associated with the use of the integrated mobile device enclosure 200 and/or the use of the mobile device enclosed thereby.

In some such embodiments, the integrated mobile device enclosure 200 may include an expansion port for receiving external devices and components. For example, the expansion port may include an I/O port configured to receive additional components which may be modularly inserted into and removed from the integrated mobile device enclosure 200. For example, the expansion port may receive one or more of additional lighting elements, additional microphones, additional power sources, additional device mounts, additional processing resources (e.g., a secondary graphical processing unit or central processing unit configured to process information for the mobile device), or the like. Further examples of additional components which may be included in the integrated mobile device enclosure 200 are described below with respect to FIG. 4.

In some such embodiments, the integrated mobile device enclosure 200 may include one or more optical modification components configured to enhance and/or modify the functionality of an image sensor of the mobile device secured within the integrated mobile device enclosure 200. For example, an optical modification component may be or include an angular lens adapter (e.g., wide angle lens adapter), an optical filter (e.g., a color or heat absorbing filter), a secondary lens for enhanced zoom, an optical diffuser (e.g., a light absorbing filter), or the like. In some such embodiments, an optical modification component of the integrated mobile device enclosure 200 may be mechanically engaged and disengaged, such as for selective content capture use. For example, a software application used for enhanced content capture and/or processing may, based on environmental measurements recorded and/or based on user input received, enable, disable, or present the option to enable or disable one or more optical modification components of the integrated mobile device enclosure 200.

Figure 3A:
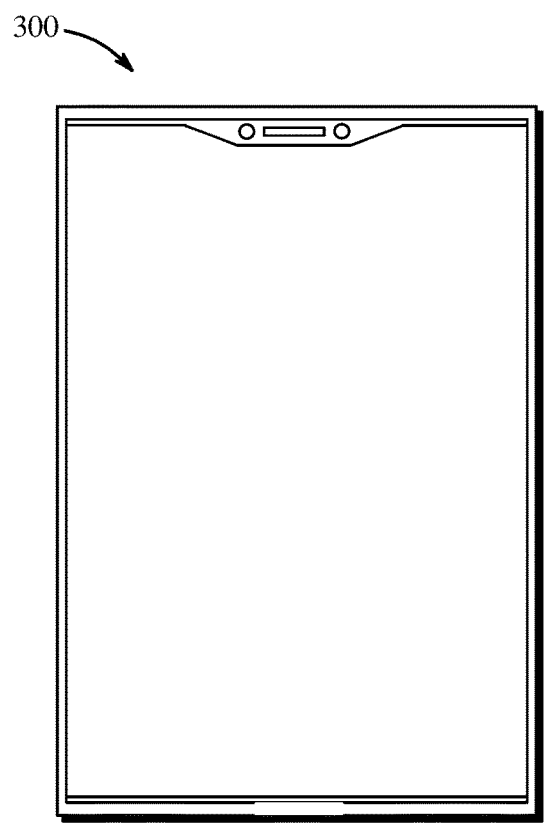
FIGS. 3A-B are illustrations of examples of front and rear views of a mobile device enclosed within an integrated mobile device enclosure.
Figure 3B:
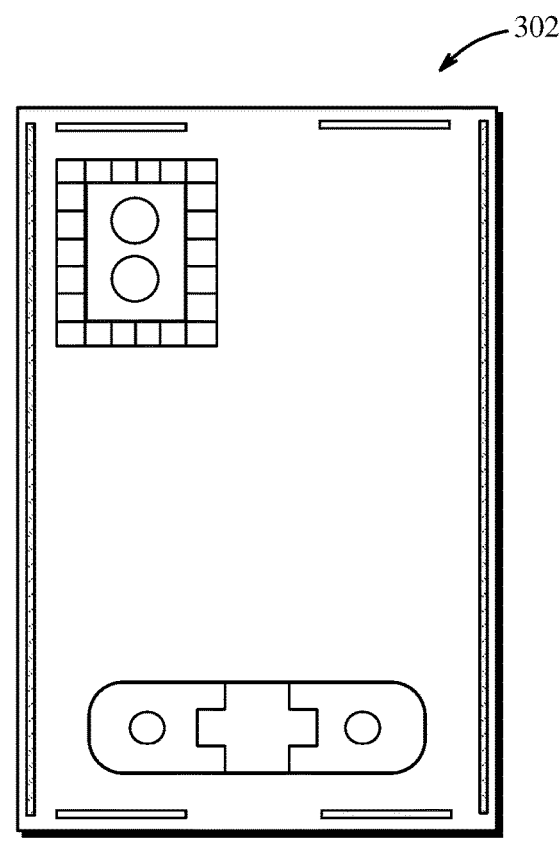

FIGS. 3A-B are illustrations of examples of front and rear views of a mobile device 300 enclosed within an integrated mobile device enclosure 302. The mobile device 300 may, for example, be the mobile device 100 shown in FIGS. 1A-B. The integrated mobile device enclosure 302 may, for example, be the integrated mobile device enclosure 200 shown in FIGS. 2A-B. The mobile device 300 enclosed within the integrated mobile device enclosure 302 as shown in provided merely by example. As such, other examples of the mobile device 300, of the integrated mobile device enclosure 302, and/or of the interaction between the mobile device 300 and the integrated mobile device enclosure 302 are possible.

Figure 4:
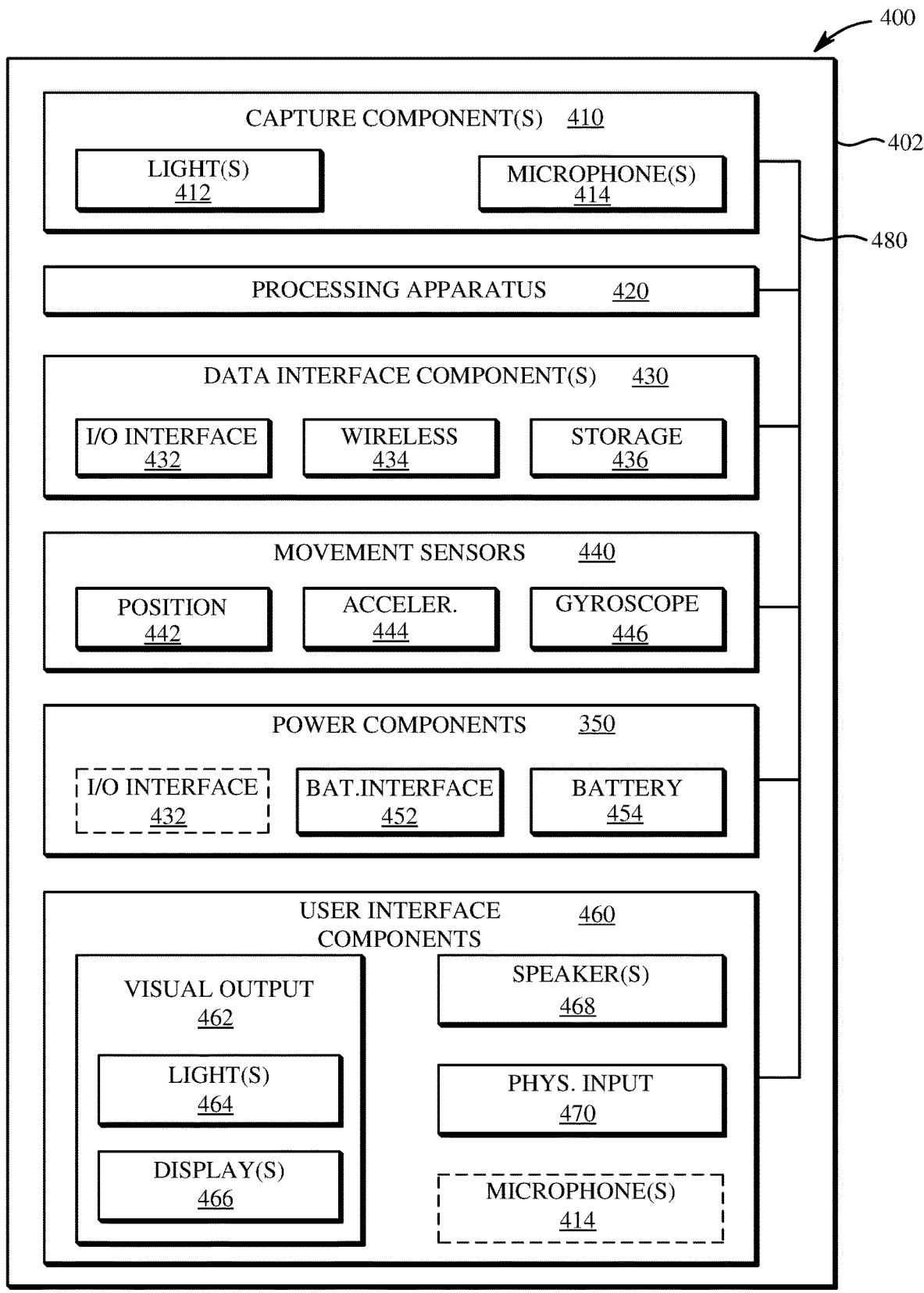
FIG. 4 is a block diagram of electronic components of an integrated mobile device enclosure.

FIG. 4 is a block diagram of electronic components of an integrated mobile device enclosure 400, which may, for example, be the integrated mobile device enclosure 200 shown in FIGS. 2A-B and/or the integrated mobile device enclosure 302 shown in FIGS. 3A-B. The integrated mobile device enclosure 400 includes a body 402 which includes electronic components such as capture components 410, a processing apparatus 420, data interface components 430, movement sensors 440, power components 450, and/or user interface components 460. The body 402 may, for example, be a body which includes exterior and interior surfaces of the integrated mobile device enclosure, for example, the exterior surface 202 and the interior surface 204 shown in FIGS. 2A-B, respectively.

The capture components 410 include one or more lights 412 and one or more microphones 414. The lights 412 are configured to enhance the capturing of images and/or video using image sensors of a mobile device (e.g., the mobile device 100 shown in FIGS. 1A-B). The microphones 414 are configured to capture audio and/or enhance the capturing of audio using microphones of a mobile device. The lights 412 are lights of a lighting array (e.g., the lighting array 210 shown in FIG. 2A). The lights are configured to enhance the luminance of a scene within which image and/or video content is captured using image sensors of the mobile device enclosed within the integrated mobile device enclosure 400. The microphones 414 are microphones (e.g., the microphones 214 shown in FIGS. 2A-B) configured to capture audio including by detecting sound, which may be recorded in conjunction with or separate from the capturing of images and/or video. The microphones 414 may also detect sound in order to receive audible commands to control the integrated mobile device enclosure 400.

The processing apparatus 420 may be configured to enable an interfacing of components of the integrated mobile device enclosure and/or to provide or enable a software application for enhanced content capture and/or processing. The processing apparatus 420 may include one or more processors having single or multiple processing cores. In some embodiments, the processing apparatus 420 may include an ASIC. For example, the processing apparatus 420 may be or include the integrated circuit 228 shown in FIG. 2B. The processing apparatus 420 may exchange data with other components of the integrated mobile device enclosure 400, such as one or more of the lights 412, the microphones 414, and/or other components, via the bus 480.

The processing apparatus 420 may include memory, such as a random-access memory (RAM) device, flash memory, or another suitable type of storage device, such as a non-transitory computer-readable memory. The memory of the processing apparatus 420 may include executable instructions and data that can be accessed by one or more processors of the processing apparatus 420. For example, the processing apparatus 420 may include one or more dynamic random-access memory (DRAM) modules, such as double data rate synchronous dynamic random-access memory (DDR SDRAM). In some embodiments, the processing apparatus 420 may include a digital signal processor (DSP). More than one processing apparatus may also be present or associated with the integrated mobile device enclosure 400.

The data interface components 430 enable communication between the integrated mobile device enclosure 400 and other electronic devices, such as the mobile device enclosed within the integrated mobile device enclosure 400. For example, the data interface components 430 may be used to receive commands to operate the integrated mobile device enclosure 400, such as by using components of the integrated mobile device enclosure 400 for enhanced content capture and/or processing. In some embodiments, the data interface components 430 may be configured for wired and/or wireless communication. For example, the data interface components 430 may include an I/O interface 432 (e.g., the I/O port 230 shown in FIGS. 2A-B) that provides wired communication to the mobile device. In some embodiments, the data interface components 430 may include a wireless data interface 434 that provides wireless communication for the integrated mobile device enclosure 400, such as a Bluetooth interface, a ZigBee interface, and/or a Wi-Fi interface. The data interface components 430 may include a storage interface 436, such as a memory card slot configured to receive and operatively couple to a storage device (e.g., a memory card) for data transfer with the mobile device enclosed within the integrated mobile device enclosure 400 (e.g., for storing captured images, video, and/or audio). In some embodiments, the storage interface 436 may be omitted.

The movement sensors 440 may detect the position and movement of the integrated mobile device enclosure 400. The movement sensors 440 may include a position sensor 442, an accelerometer 444, or a gyroscope 446. The position sensor 342, such as a global positioning system (GPS) sensor, is used to determine a position of the integrated mobile device enclosure 400. The accelerometer 444, such as a three-axis accelerometer, measures linear motion (e.g., linear acceleration) of the integrated mobile device enclosure 400. The gyroscope 446, such as a three-axis gyroscope, measures rotational motion (e.g., rate of rotation) of the integrated mobile device enclosure 400. Other types of movement sensors 440 may also be present or associated with the integrated mobile device enclosure 400. In some embodiments, the movement sensors 440 may be omitted.

The power components 450 may receive, store, and/or provide power for operating the integrated mobile device enclosure 400. The power components 450 may include a battery interface 452 and a battery 454. The battery 454 may, for example, be the power source 218 shown in FIG. 2B. The battery interface 452 operatively couples to the battery 454, for example, with conductive contacts to transfer power from the battery 454 to the other electronic components of the integrated mobile device enclosure 400. The power components 450 may also include the I/O interface 432, as indicated in dotted line, and the power components 450 may receive power from an external source, such as a wall plug or external battery, for operating the integrated mobile device enclosure 400 and/or charging the battery 454 of the integrated mobile device enclosure 400. In some embodiments, the power components 450 may not include the I/O interface 432.

The user interface components 460 may allow the user of the integrated mobile device enclosure 400 to interact with the integrated mobile device enclosure 400, for example, by providing outputs to the user and receiving inputs from the user. The user interface components 460 may include visual output components 462 to visually communicate information and/or present captured images to the user. The visual output components 462 may include one or more lights 464 and/or more displays 466. The display(s) 466 may be configured as a touch screen that receives inputs from the user. The user interface components 460 may also include one or more speakers 468. The speaker(s) 468 can function as an audio output component that audibly communicates information and/or presents recorded audio to the user. The user interface components 460 may also include one or more physical input interfaces 470 that are physically manipulated by the user to provide input to the integrated mobile device enclosure 400. The physical input interfaces 470 may, for example, be configured as buttons, toggles, or switches. The user interface components 460 may also be considered to include the microphones 414, as indicated in dotted line, and the microphones 414 may function to receive audio inputs from the user, such as voice commands or the like. In some embodiments, the user interface components 460 may be omitted.

Figure 5:
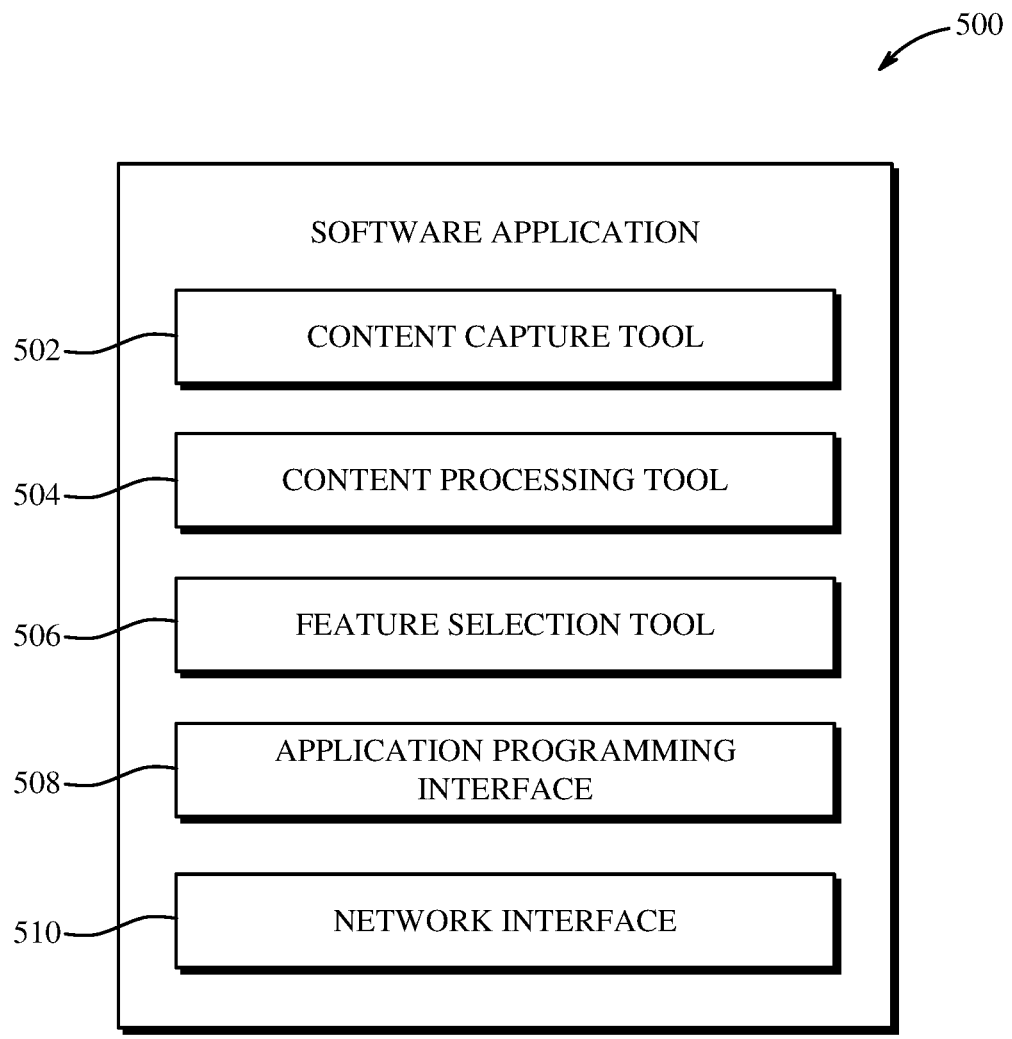
FIG. 5 is a block diagram of examples of functionality of a software application used in connection with an integrated mobile device enclosure.

FIG. 5 is a block diagram of examples of functionality of a software application 500 used in connection with an integrated mobile device enclosure, which may, for example, be the integrated mobile device enclosure 200 shown in FIGS. 2A-B and/or the integrated mobile device enclosure 400 shown in FIG. 4. The software application 500 may be a software application pre-installed within a memory, for example, of an integrated circuit (e.g., the integrated circuit 228 shown in FIG. 2B) of the integrated mobile device enclosure or of a mobile device enclosed within the integrated mobile device enclosure (e.g., the mobile device 100 shown in FIGS. 1A-B). Alternatively, the software application 500 may be a software application available for download, such as to a memory of the mobile device.

The software application 500 includes various software tools for enhanced content capture and/or processing. For example, as shown, the software application 500 includes a content capture tool 502, a content processing tool 504, and a feature selection tool 506. The software application 500 may further include other software functionality for integrating the software tools with aspects of a mobile device. For example, as shown, the software application 500 includes an application programming interface (API) 508 and a network interface 510.

The content capture tool 502 uses one or more features of the integrated mobile device enclosure and/or of the mobile device for content capture. A feature of the integrated mobile device enclosure and/or of the mobile device may include a component of same, a set of components of same (e.g., as may be referred to by functionality implemented using the set of components), or a functionality implemented using one or more components of same. A feature may, for example, be a microphone, a set of microphones based on location on the mobile device or integrated mobile device enclosure, a set of microphones based on direction of audio capture, a set of microphones based on a scene within which content is captured, a set of microphones based on other criteria, a light of a lighting array, a set of lights of a lighting array based on location on the mobile device or integrated mobile device enclosure, a set of lights of a lighting array based on a scene within which content is captured, a set of lights of a lighting array based on other criteria, an optical modification component, multiple optical modification components, or the like. Using one or more features for content capture includes capturing content using the one or more features.

The content processing tool 504 is configured to process content captured at or otherwise using the content capture tool 502. Processing content capturing at or otherwise using the content capture tool 502 may include adjusting one or more aspects of the audio, image, and/or video content captured at or using the content capture tool 502. For example, the content processing tool 504 may include content editing tools for changing the appearance of objects within images, for changing a framerate of a video, for introducing effects into audio, and/or the like. The functionality of the content processing tool 504 includes at least conventional functionality for audio, image, and video processing. In some embodiments, the content processing tool 504 can be configured to adjust one or more audio and/or visual aspects of the content captured using the content capture tool 502 according to content processing definitions established for the software application 500. For example, the content processing definitions may be or include definitions or settings of filters, filter selections, image object detection parameters, audio artifact detection parameters, and/or the like.

In some embodiments, the content processing capabilities of the content processing tool 504 may be limited or expanded based on the features selected for content capture. For example, the selection of one or more optical modification components may enable different types of content processing, such as due to the different lens angle used to capture the content, the different filtering and/or diffusion applied based on the color, heat, and/or light reduction, or the like. As such, content captured using one or more optical modification components of an integrated mobile device enclosure as disclosed herein may enable content processing or results thereof beyond enhanced quality, such as those processing or results which are otherwise unobtainable using only components the mobile device secured within the integrated mobile device enclosure.

The feature selection tool 506 configures features of the mobile device and/or of the integrated mobile device enclosure for content capture. Configuring the features of the mobile device and/or of the integrated mobile device enclosure for content capture may include enabling the selection or deselection of features of the mobile device and/or of the integrated mobile device enclosure available for capturing content. For example, features such as microphones, lights, or the like may be toggled on or off to enhance the content capture. Selecting or deselecting features of the mobile device and/or of the integrated mobile device enclosure may cause a change in the content captured using the content capture tool 502, such as by introducing or limiting lighting or by recording more or fewer sounds.

In some embodiments, the selection or deselection of features using the feature selection tool 506 may be automated, such as without manual user intervention. For example, before or during content capturing, the feature selection tool 506 may use a scene checker to collect environmental information including measurements of the environment in which the mobile device running the software application 500 is located, such as to determine or otherwise present options relating to features to select or deselect. In this way, sensors measuring an amount of light, an amount of noise, or both within the environment in which the mobile device is located can be used to determine which features may be selected or deselected or otherwise presented for selection or deselection. For example, the feature selection tool 506 can use sensor input to determine a perceived directionality of sound and selectively enable or disable certain microphones of the mobile device and/or of the integrated mobile device enclosure based on that perceived directionality.

In some embodiments, the selection or deselection of features using the feature selection tool 506 may be based only on user input. For example, the feature selection tool 506 may present a user of the software application 500 with options for selecting or deselecting features of the mobile device and/or of the integrated mobile device enclosure. For example, the options may be presented to the user of the software application 500 before or during operations for capturing content using the content capture tool 502. In some such embodiments, sensor input representing measurements of light, noise, or other qualities of the environment in which the mobile device running the software application 500 is located can be output for review by a user of the software application 500. The user of the software application 500 may consider that output when determining which features to select or deselect.

In some embodiments, the content capture tool 502 may include the feature selection tool 506. For example, aspects of feature selection described with respect to the feature selection tool 506 may be built into the content capture tool 502. In some embodiments, a user of the software application 500 may be presented with options for selecting or deselecting features of the mobile device and/or of the integrated mobile device enclosure before capturing content. In some such embodiments, the presentation of options for selecting or deselecting such features to the user of the software application 500 may be automated, such as each time the user initiates a content capture process using the software application 500. In some such embodiments, the presentation of options for selecting or deselecting such features to the user of the software application 500 may be responsive to user input, such as where such options are presented in response to the software application 500 receiving an indication from the user thereof that the user wants to change the selection of deselection of features. In some embodiments, the feature selection tool 506 or the content capture tool 502, as applicable, may include functionality for recording a user preference indicating how presentations of options for selecting or deselecting features for content capture are made.

The API 508 configures the software application 500 for interfacing with the mobile device, the integrated mobile device enclosure, and other software applications installed or otherwise run wholly or partially on the mobile device. The API 508 may include definitions of various APIs which may be used by or otherwise in connection with the operation of the software application 500. For example, the API 508 may include a definition of an API for various native software applications of the mobile device which may be controlled or otherwise used to capture and/or process content. For example, an API of a native camera application of the mobile device may be exposed to the API 508. In another example, a system API of the mobile device which implicates various sensors used for content capture (e.g., microphones, cameras, or the like) may be exposed to the API 508.

In some embodiments, the API 508 may be extensible by a user of the software application 500. For example, the user of the software application 500 may be given privileges or permissions for integrating the software application 500 with one or more hardware or software aspects of the mobile device running the software application 500, but which have not already been integrated. In such a case, an API of such hardware or software aspects may be exposed to the API 508. In another example, the software application 500 may receive updates from time to time, which may cause an extension of functionality of the software application 500. In some such cases, the extended functionality may implicate hardware or software, of the mobile device running the software application 500 and/or of another device, not already integrated. In such a case, an API of the hardware or software aspects may be exposed to the API 508.

The network interface 510 provides a connection or link to a network, which may, for example, be a local area network, a wide area network, a machine-to-machine network, a virtual private network, or another public or private network. The network interface 510 interacts with a network interface component of the integrated mobile device enclosure or of the mobile device on which the software application runs. The network interface component can be a wired network interface component or a wireless network interface component. The network interface 510 enables communications between the software application 500 and hardware or software aspects of other devices using one or more network protocols, such as using Wi-Fi, Bluetooth, infrared, GPRS, GSM, CDMA, Z-Wave, ZigBee, another protocol, or a combination thereof.

In some embodiments, the network interface 510 may be omitted. For example, the API 508 may be exposed to an API for a network interface component of the mobile device on which the software application 500 runs. In such an embodiment, the software application 500 can cause the network interface component of the mobile device to communicate information over a network using a system API call to the network interface component.

Figure 6:
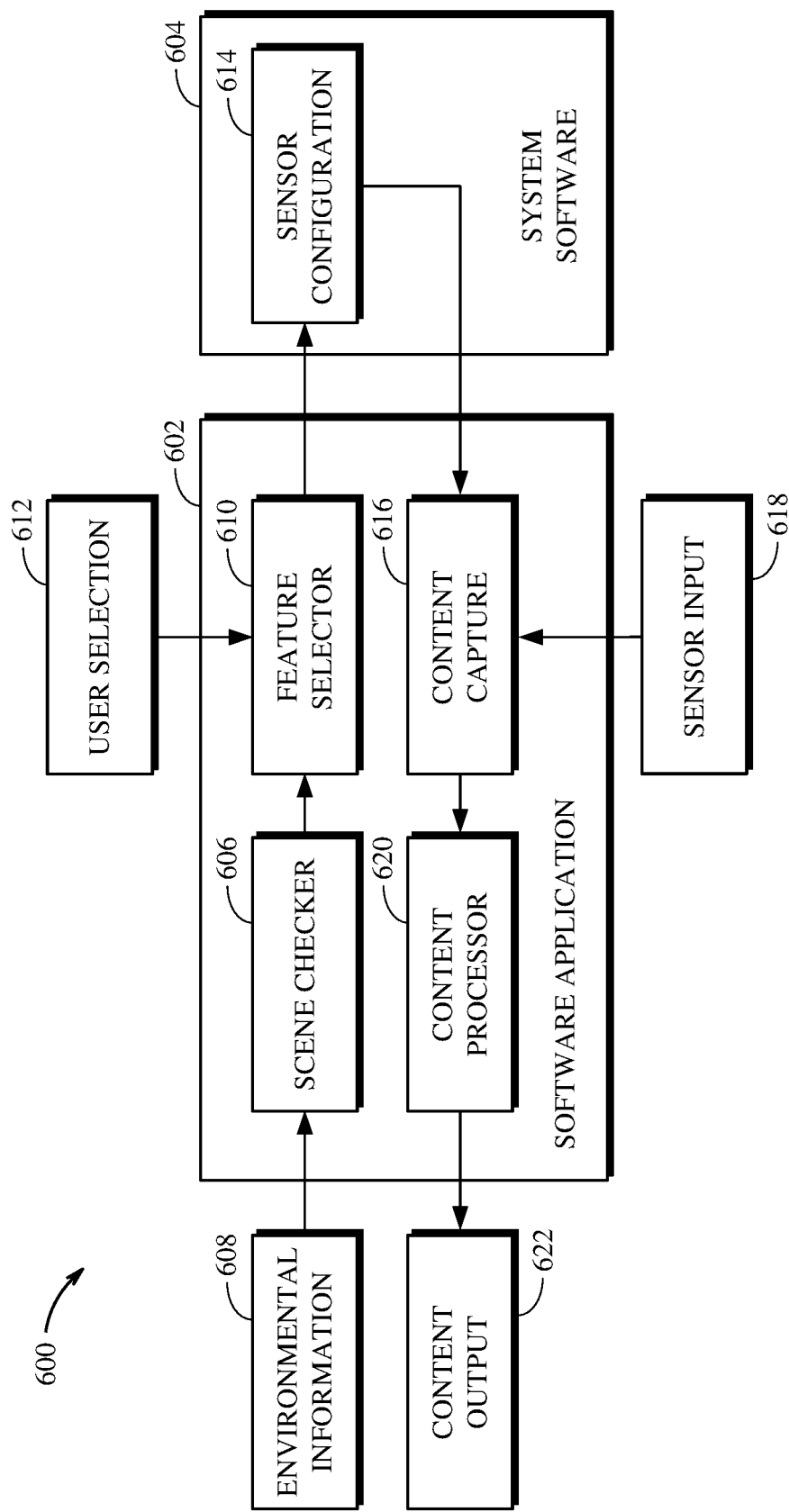
FIG. 6 is a block diagram of an example of a content capture pipeline which uses an integrated mobile device enclosure.

FIG. 6 is a block diagram of an example of a content capture pipeline 600 which uses an integrated mobile device enclosure, which may, for example, be the integrated mobile device enclosure 200 shown in FIGS. 2A-B and/or the integrated mobile device enclosure 400 shown in FIG. 4. The content capture pipeline 600 describes operations performed at, by, or otherwise using a software application 602 used in connection with an integrated mobile device enclosure and system software 604 used in connection with the operation of a mobile device enclosed by the integrated mobile device enclosure. The software application 602 may, for example, be the software application 500 shown in FIG. 5. The system software 604 may, for example, be or refer to routines, operations, processes, or the like for controlling mobile device features or other sensors or functionality in connection with a content capture process and/or in connection with a content processing process.

At the start of the content capture pipeline 600, a scene checker aspect 606 of the software application 602 collects environmental information 608 representing measurements of the environment in which the mobile device is located. The scene checker aspect 606 may use the environmental information 608 to determine or otherwise present options relating to features to select or deselect. In this way, sensors measuring an amount of light, an amount of noise, or both within the environment in which the mobile device is located can be used to determine which features may be selected or deselected or otherwise presented for selection or deselection. The scene checker aspect 606 may be implemented by or using a feature selection tool of the software application, such as the feature selection tool 506 shown in FIG. 5. For example, the feature selection tool 506 can use sensor input to determine a perceived directionality of sound and selectively enable or disable certain microphones of the mobile device and/or of the integrated mobile device enclosure based on that perceived directionality.

The information about the scene is output from the scene checker aspect 606 to a feature selector aspect 610 of the software application 500. The feature selector aspect 610 uses the output of the scene checker aspect 606 to select a list of features for content capture. The features included in the list of features may be identified based on their applicability in the scene of the content to be captured, as which may be determined based on the output of the scene checker aspect 606. For example, for a scene with a relatively low level of light, the feature selector aspect 610 may include one or more lights or sets of lights of one or more lighting arrays. In some embodiments, the feature selector aspect 610 may present the list of features to a user of the integrated mobile device enclosure for selection. For example, the feature selector aspect 610 can receive a user selection 612 indicating the one or more features to use to capture content. The user selection 612 may, for example, be received responsive to a presentation of the list of available features. In some embodiments, the feature selector aspect 610 may present a list of some or all features of the integrated mobile device enclosure and/or of the mobile device enclosed within same without regard to or without limitation based on the environmental information 608.

An indication of the selected features is passed to a sensor configuration aspect 614 of the system software 604. The sensor configuration aspect 614 receives the indication of the features selected for content capture and uses same to enable those features for content capture using the software application 602. For example, the sensor configuration aspect 614 may interface with an API of the mobile device and/or an API of the integrated mobile device enclosure to configure or otherwise activate the selected features for content capture. In some embodiments, use of the software application 602, such as prior to or at the time of the desired content capture, may include granting or otherwise establishing permissions for the use of features of the mobile device and/or of the integrated mobile device enclosure. In some such embodiments, the sensor configuration aspect 614 may be omitted, in which case the indication of the selected features may be passed directly for further use within the pipeline 600. In other such embodiments, the sensor configuration aspect 614 may use the permissions to prepare the selected features for use in the desired content capture.

A content capture aspect 616 of the software application 602 uses the configured or otherwise activated features of the mobile device and/or of the integrated mobile device enclosure to capture content. Capturing content can include using sensor input 618 capturing one or more image signals, audio signals, and/or video signals. The sensor input 618 is or includes information which is recorded or otherwise measured using one or more of the configured or otherwise activated features The capturing may be performed by a user of the integrated mobile device enclosure interacting with user interface elements of the integrated mobile device enclosure and/or of the mobile device to cause the capturing of the content.

A content processor aspect 620 of the software application 602 receives the content captured at or otherwise using the content capture aspect 616 and enables the processing of such content for finalization and output. Enabling the processing of the captured content may include presenting one or more content processing tools to a user of the integrated mobile device enclosure to enable the user to modify one or more aspects of the captured content. The content modified at or otherwise using the content processor aspect 620 is the output for storage and/or display or performance as the content output 622. In some embodiments, the content processor aspect 620 may be omitted. In such an embodiment, the content output 622 is output directly from the content capture aspect 616.

Figure 7:
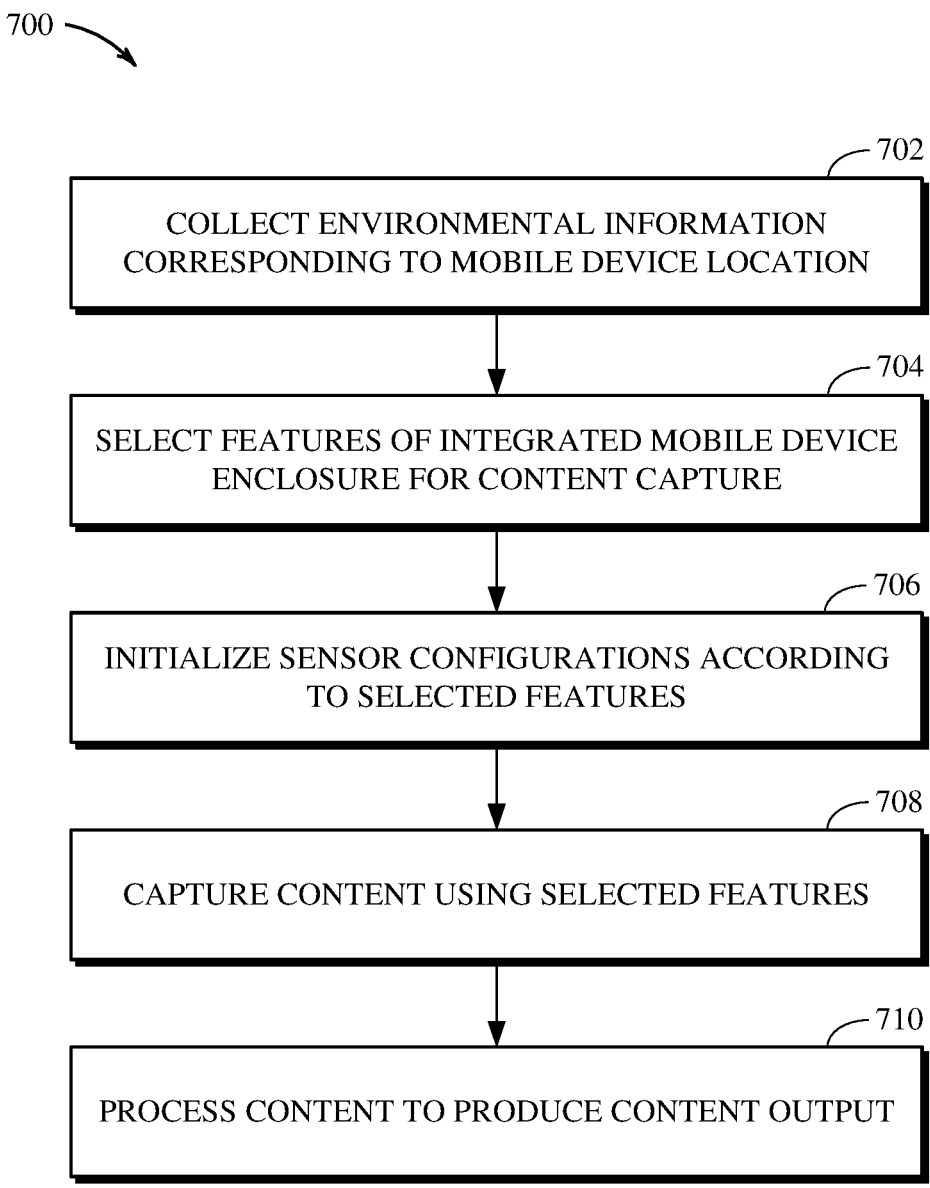
FIG. 7 is a flowchart of an example of a technique for content capture using an integrated mobile device enclosure.

FIG. 7 is a flowchart of an example of a technique 700 for content capture using an integrated mobile device enclosure. Although the technique 700 is described with respect to a series of operations, the operations comprising the technique 700 may be performed in orders other than those described herein. In some embodiments, the technique 700 may include additional, fewer, or different operations than as described herein. The technique 700 can be performed, for example, using an integrated mobile device enclosure, such as the integrated mobile device enclosure 200 shown in FIGS. 2A-B and/or the integrated mobile device enclosure 400 shown in FIG. 4, which encloses a mobile device, such as the mobile device 100 shown in FIGS. 1A-B.

For example, the technique 700 can be performed using a software application, for example, the software application 500 shown in FIG. 5 and/or the software application 602 shown in FIG. 6, configured for enhanced content capture and/or processing, such as for capturing and/or processing images, video, audio, or a combination thereof. In another example, the technique 700 can be performed using an integrated circuit of an integrated mobile device enclosure or of a mobile device, for example, the integrated circuit 228 shown in FIG. 2B and/or an integrated circuit of the processing apparatus 420 shown in FIG. 4. The integrated circuit may, for example, be a FPGA, a PLD, a RCF, a SoC, an ASIC, and/or another type of integrated circuit. An image processor of the integrated circuit includes a content capture unit configured to execute instructions to perform some or all of the technique 700.

At 702, environmental information including measurements of an environment in which the mobile device is located are collected. In some embodiments, the collection of the environmental information may be performed using a scene checker of the software application. The environmental information may indicate noise measurements, light measurements, or other measurements of the location of the mobile device. The environmental information is collected using sensors of the mobile device. However, the environmental information may be collected in other manners. In some embodiments, the environmental information may be collected using features of the integrated mobile device enclosure, such as using one or more microphones and/or one or more lights of the integrated mobile device enclosure. In some embodiments, the environmental information may be collected using the sensors of the mobile device and the features of the integrated mobile device enclosure.

At 704, one or more features of the integrated mobile device enclosure are selected for content capture. The features of the integrated mobile device enclosure include, but are not limited to, microphones (e.g., the microphones 214 shown in FIGS. 2A-B), lights (e.g., of the lighting array 210 shown in FIG. 2A), lighting arrays (e.g., the lighting array 210), or the like or a combination thereof. The microphones are configured to enhance a capture of audio content at the mobile device, such as by introducing additional sensors for audio capture to assist built-in microphones of the mobile device. The lighting arrays include one or more lights which are configured to enhance a capture of visual content at the mobile device, such as by introducing additional sensors for image or video capture to assist built-in cameras of the mobile device.

The selection of features of the integrated mobile device enclosure is based on the environmental information collected at 704. For example, some or all features may be selected or deselected based on qualities of a scene within which content is to be captured, such as based on a direction of certain types of sound (e.g., a direction of human voice when other noise is present in the scene), an amount of lighting, and/or other qualities. In some embodiments, features identified as being available and/or relevant for content capture may be presented to a user of the integrated mobile device enclosure. For example, the user may provide a user selection of the features to use as further input for the content capture process.

At 706, one or more sensors of the mobile device and/or of the integrated mobile device enclosure are initialized based on the selection of features of the integrated mobile device enclosure. Initializing the sensors of the mobile device based on the selection of features of the integrated mobile device enclosure can include using the software application to transmit instructions, commands, requests, or other communications to system software running on the mobile device, such as to cause the system software to initialize sensors of the mobile device and/or of the integrated mobile device enclosure based on the selected features of the integrated mobile device enclosure. For example, permissions granted to the software application may be used to enable access to a camera of the mobile device, which may be enhanced for content capture using a lighting assembly of the integrated mobile device enclosure. In some embodiments, the instructions, commands, requests, or other communications may be transmitted using API calls of an API of the system software, which may, for example, have been previously exposed to the software application.

At 708, content is captured using the selected features of the integrated mobile device enclosure. Capturing the content using the selected features includes using the initialized sensors of the mobile device and/or of the integrated mobile device enclosure to capture content. For example, the content capture operations can include enabling a user of the integrated mobile device enclosure to begin capturing content. The user may begin capturing content by indicating or signaling a request to begin content capture using one or more user interface elements, which may, for example, include one or more I/O elements, such as buttons, keys, touchscreen aspects, voice control aspects, or the like of the mobile device and/or of the integrated mobile device enclosure. Capturing the content may include the software application outputting user interface elements to a display of the mobile device, such as to initiate the content capture.

At 710, the captured content is processed to produce content output. Processing the captured content can include performing one or more adjustments or other modifications to the captured content to change one or more aspects thereof. Examples of adjustments or other modifications which may be made to the captured content include, but are not limited to, removing artifacts, changing color or appearance settings, cropping, adding borders, changing frequencies or pitches, adding sounds, adding text blurbs or bubbles, filtering content, moving audio or image data, and so on. The particular processing operations performed against the captured content may be selected by a user of the integrated mobile device enclosure, for example, from a list of available options presented or otherwise made available at or using the software application. The content output is then output for storage or display.

In some embodiments, the collection of the environmental information at 702 can be omitted from the technique 700. For example, the selection of features of the integrated mobile device enclosure may be according to default configurations of the software application. In another example, the selection of features of the integrated mobile device enclosure may be according to user input received from a user of the software application. For example, the user input may be user input received responsive to prompting the user to select the features by a presentation of feature options available for selection.

In some embodiments, the processing of the captured content at 710 can be omitted from the technique 700. For example, the content output may be produced and output for storage or display as part of the operations for capturing content at 708, such as without the captured content being further processed. In some embodiments, the processing of the captured content at 710 can be automated by the software application. For example, the software application can be configured to adjust one or more audio and/or visual aspects of the captured content according to content processing definitions established for the software application. In some such embodiments, the automated processing by the software application can be in place of processing which would otherwise be performed based on user input. In some such embodiments, the automated processing by the software application can be in addition to processing which may be performed based on user input. For example, the automated processing may be performed as a pre-processing step before the processing based on the user input is performed.

In some embodiments, the technique 700 may further include reconfiguring a list of features available for selection responsive to a replacement of the one or features of the integrated mobile device enclosure with different features. For example, in embodiments in which the features of the integrated mobile device enclosure are modular, a replacement of a feature of the integrated mobile device enclosure with a different feature may be detected using the software application. Detection of the replacement may include reconfiguring the list of available features by removing the replaced feature from the list and adding the new feature to the list. In some such embodiments, the reconfiguring of the list of features may be performed as part of operations for initializing the software application.

Where certain elements of these embodiments may be partially or fully implemented using known components, those portions of such known components that are necessary for an understanding of the present disclosure have been described, and detailed descriptions of other portions of such known components have been omitted so as not to obscure the disclosure.

In the present specification, an embodiment showing a singular component should not be considered limiting; rather, the disclosure is intended to encompass other embodiments including a plurality of the same component, and vice-versa, unless explicitly stated otherwise herein. Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)). Such program may be developed for use with one or more operating systems, for example, Microsoft Windows®, MacOS®, Linux®, iOS®, Android®, or the like.

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., field programmable gate arrays (FPGAs)), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet embodiments), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed embodiments, or the order of performance of two or more steps may be permuted. All such variations are considered to be encompassed within this disclosure.

While the above-detailed description has shown, described, and pointed out novel features of the disclosure as applied to various embodiments, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. An integrated mobile device enclosure, comprising:
a case configured to enclose at least a portion of a mobile device, the case including a body, one or more microphones, a lighting array, an integrated circuit, and a device mount,
wherein the body includes at least an exterior surface and an interior surface, wherein the exterior surface includes an opening for a rear-facing camera of the mobile device, and wherein a lip of the interior surface encloses at least a portion of a front surface of the mobile device when the mobile device is enclosed by the body,
wherein the one or more microphones are disposed within one or more first portions of the body and are configured to capture sound external to the mobile device,
wherein the lighting array is disposed within a second portion of the body proximate to the opening of the exterior surface and includes one or more lights configured to support the rear-facing camera of the mobile device,
wherein the integrated circuit is disposed within a third portion of the body and configures the one or more microphones and the one or more lights for use with a software application running on the mobile device, and
wherein the device mount is disposed within a fourth portion of the body and includes two finger members movable relative to the body between an extended state and a collapsed state, wherein the two finger members extend outward from the body for receipt by a support mount of an external support in the extended state and the two finger members are collapsed toward the body in the collapsed state.

2. The integrated mobile device enclosure of claim 1, wherein at least one of the one or more microphones or the lighting array are removably coupled to the body.

3. The integrated mobile device enclosure of claim 1, wherein the case further includes an input-output port configured for insertion within a port of the mobile device, wherein the use of the one or more microphones and the lighting array with the software application is based on the insertion of the input-output port within the port of the mobile device.

4. The integrated mobile device enclosure of claim 3, wherein the case further includes a supplemental power source configured to deliver power to the at least one of the one or more microphones and the one or more lights, wherein the supplemental power source is charged by a power source of the mobile device while the input-output port is inserted within the port of the mobile device.

5. The integrated mobile device enclosure of claim 1, wherein selections of the one or more microphones or the one or more lights at the software application are based on environmental information measured for a location of the mobile device.

6. The integrated mobile device enclosure of claim 5, wherein the environmental information identifies one or more of an amount of light, an amount of noise, or a perceived directionality of sound within the location of the mobile device.

7. The integrated mobile device enclosure of claim 1, wherein the case further includes one or more optical modification components configured to enhance or modify functionality of the rear-facing camera of the mobile device.

8. The integrated mobile device enclosure of claim 7, wherein use of the one or more optical modification components is selectively enabled or disabled using the software application based on environmental information measured for a location of the mobile device.

9. The integrated mobile device enclosure of claim 1, wherein the one or more microphones include at least one directional microphone configured to capture sound in one or more directions relative to the integrated mobile device enclosure.

10. The integrated mobile device enclosure of claim 9, wherein the one or more first portions include openings for enhancing capture of the sound external to the mobile device using the one or more microphones.

11. An integrated mobile device enclosure, comprising:
a case configured to enclose at least a portion of a mobile device, the case including a body, one or more microphones, a lighting array, and an integrated circuit,
wherein the one or more microphones are disposed within one or more first portions of the body and are configured to capture sound external to the mobile device, wherein the lighting array is disposed within a second portion of the body and includes one or more lights configured to support a camera of the mobile device; and wherein the integrated circuit is disposed within a third portion of the body and configures the one or more microphones and the one or more lights for use with a software application running on the mobile device.

12. The integrated mobile device enclosure of claim 11, wherein the case further includes a device mount including two finger members movable relative to the body between an extended state and a collapsed state, wherein the two finger members extend outward from the body for receipt by a support mount of an external support in the extended state and the two finger members are collapsed toward the body in the collapsed state.

13. The integrated mobile device enclosure of claim 11, wherein selections of the one or more microphones or the one or more lights at the software application are based on environmental information measured for a location of the mobile device.

14. The integrated mobile device enclosure of claim 11, wherein at least one of the one or more microphones or the lighting array are removably coupled to the body.

15. The integrated mobile device enclosure of claim 11, wherein the lighting array is a first lighting array and the camera is a first camera of the mobile device, and wherein the case further includes a second lighting array including one or more lights configured to support a second camera of the mobile device, wherein the integrated circuit configures the one or more lights of the second lighting array for use with the software application.

16. The integrated mobile device enclosure of claim 11, wherein the case further includes a supplemental power source configured to deliver power to the at least one of the one or more microphones and the one or more lights.

17. An integrated mobile device enclosure, comprising:
a case configured to enclose at least a portion of a mobile device the case including a body, one or more microphones, and one or more lights,
wherein the one or more microphones are removably coupled to the body and configured for use with a software application running on the mobile device; and
wherein the one or more lights are removably coupled to the body and configured for use with the software application.

18. The integrated mobile device enclosure of claim 17, where the case further includes an integrated circuit disposed the body, wherein the integrated circuit configures the one or more microphones and the one or more lights for use with the software application.

19. The integrated mobile device enclosure of claim 17, wherein the case further includes a device mount including two finger members movable relative to the body between an extended state and a collapsed state.

20. The integrated mobile device enclosure of claim 17, wherein selections of the one or more microphones or the one or more lights at the software application are based on environmental information measured for a location of the mobile device.

* * * * *